United States Patent
Zhang et al.

(10) Patent No.: US 10,534,664 B2
(45) Date of Patent: Jan. 14, 2020

(54) IN-MEMORY DATA STORAGE WITH ADAPTIVE MEMORY FAULT TOLERANCE

(71) Applicant: ScaleFlux, San Jose, CA (US)

(72) Inventors: Tong Zhang, Albany, NY (US); Hao Zhong, Los Gatos, CA (US); Fei Sun, Irvine, CA (US); Yang Liu, Milpitas, CA (US)

(73) Assignee: SCALEFLUX, San Jose, CA (US)

( * ) Notice: Subject to any disclaimer, the term of this patent is extended or adjusted under 35 U.S.C. 154(b) by 359 days.

(21) Appl. No.: 15/417,853

(22) Filed: Jan. 27, 2017

(65) Prior Publication Data

US 2017/0220441 A1  Aug. 3, 2017

Related U.S. Application Data

(60) Provisional application No. 62/290,903, filed on Feb. 3, 2016.

(51) Int. Cl.
*G06F 11/10* (2006.01)
*G06F 11/20* (2006.01)

(52) U.S. Cl.
CPC ...... *G06F 11/1044* (2013.01); *G06F 11/1012* (2013.01); *G06F 11/1092* (2013.01); *G06F 11/2094* (2013.01)

(58) Field of Classification Search
CPC ............. G06F 11/1012; G06F 11/1044; G06F 11/1092; G06F 11/2094
See application file for complete search history.

(56) References Cited

U.S. PATENT DOCUMENTS

| | | | |
|---|---|---|---|
| 2002/0174315 A1* | 11/2002 | Yamamoto | G06F 3/0613 711/170 |
| 2015/0012794 A1* | 1/2015 | Losh | G06F 11/1008 714/755 |
| 2016/0070477 A1* | 3/2016 | Sugino | G06F 8/654 711/103 |
| 2016/0231803 A1* | 8/2016 | Iwai | G06F 1/3275 |
| 2017/0149931 A1* | 5/2017 | Lochhead | H04L 67/327 |

* cited by examiner

*Primary Examiner* — Jigar P Patel
(74) *Attorney, Agent, or Firm* — Hoffman Warnick LLC (57) ABSTRACT

A storage aware memory controller for managing a physical storage system. A described controller: a system for mapping physical memory space into a memory region and a storage region; a system for applying different error protections schemes, in which a fine-grained memory fault tolerance scheme is applied to data in the memory region and a course-grained memory fault tolerance scheme is applied to data in the storage region; and a storage file system that includes a mapping table for mapping logical addresses to physical addresses for data stored in the storage region.

17 Claims, 5 Drawing Sheets

Logical address of one block in 1-bit/cell storage partition

| $c_1$-bit virtual block ID | $s_1$-bit block index |
|---|---|

Virtual block mapping table for 1-bit/cell storage partition

| Virtual block ID | Address of the 1st physical memory page | ... | Address of the $n_{p-1}$-th physical memory page |
|---|---|---|---|
| 0 | $A_{0,1}$ | ... | $A_{0,n_{p-1}}$ |
| 1 | $A_{1,1}$ | ... | $A_{1,n_{p-1}}$ |
| 2 | $A_{2,1}$ | ... | $A_{2,n_{p-1}}$ |
| ... | ... | ... | ... |

FIG. 3

| Logical address of one block in m-bit/cell storage partition |
|---|
| $c_m$-bit virtual block ID / $s_m$-bit block index |

Virtual block mapping table for m-bit/cell storage partition

| Virtual block ID | Address of the 1st physical memory page | ... | Address of the $n_{p-m}$-th physical memory page |
|---|---|---|---|
| 0 | $A_{0,1}$ | ⋮ | $A_{0,n_{p-m}}$ |
| 1 | $A_{1,1}$ | ⋮ | $A_{1,n_{p-m}}$ |
| 2 | $A_{2,1}$ | ⋮ | $A_{2,n_{p-m}}$ |
| ... | ... | ... | ... |

IN-MEMORY DATA STORAGE WITH ADAPTIVE MEMORY FAULT TOLERANCE

PRIORITY CLAIM

This application claims priority to U.S. Provisional Patent Application Ser. No. 62/290,903 filed Feb. 3, 2016, which is hereby incorporated herein as though fully set forth.

TECHNICAL FIELD

The present invention relates to the field of computer memory, and particularly to improving cost effectiveness of implementing in-memory data storage in various computing systems.

BACKGROUND

Driven by the inevitable trend towards the cloud, more and more real-time in-memory computing applications are being served by large-scale parallel processing platforms (e.g., Hadoop). As a result, large-scale parallel processing platforms must employ distributed in-memory data storage systems to realize data sharing and exchange among different in-memory computation frameworks and jobs. Distributed in-memory data storage systems form a large-scale distributed cache layer sitting between in-memory computation frameworks/jobs and persistent storage systems (e.g., Amazon S3 and HDFS).

However, in-memory storage is fundamentally subject to two cost issues, and how well one can tackle these two cost issues largely affects the overall system performance of future large-scale parallel processing platforms: (1) Memory resource cost: It is apparent that in-memory data storage tends to occupy a large amount of memory capacity. This will become increasingly significant as more and more memory-centric data processing tasks are being migrated onto a single large-scale parallel processing platform. This directly results in memory resource confliction between the application layer and the underlying in-memory data storage layer. In spite of the continuous scaling of DRAM beyond the 20 nm node and the maturing new low-cost memory technologies (e.g., 3D XPoint), the ever-increasing demand for more memory capacity will keep memory as one of the most expensive resources. Hence, it is highly desirable to minimize the memory capacity (and hence cost) overhead induced by in-memory data storage systems. (2) Computation cost: Different from a traditional buffer pool mechanism, in-memory data storage systems hold the data in the storage-oriented format (e.g., JSON, Parquet, and ORC) other than as in-memory objects. Therefore, when moving data across the application layer and in-memory storage layer, data format conversion is required and can result in significant computation cost. In addition, as the most obvious option to reduce memory capacity overhead of in-memory data storage, data compression inevitably leads to further computation cost. This directly results in computation resource confliction between the application layer and the underlying in-memory data storage layer.

In current practice, the memory controller is completely unaware of in-memory data storage and has to use the same fine-grained memory fault tolerance mechanism, in particular ECC (error correction code), to protect the entire memory. In current mainstream computing systems, memory controllers employ the SEC-DED (single error correction, double error detection) code to protect each 8-byte user data with 1-byte coding redundancy, which is primarily for handling DRAM soft errors caused by radiation. As a result, DRAM modules are typically 72-bit DIMMs to accommodate such ECC configuration. For sub-20 nm DRAM and emerging new memory technologies (such as 3D XPoint), such a weak ECC could be inadequate and one may have to increase the memory fault tolerance strength at the cost of higher redundancy.

SUMMARY

Accordingly, an embodiment of the present disclosure is directed to a system and process for reducing the memory resource cost in the realization of in-memory data storage systems. A disclosed device provides a storage-aware memory controller integrated circuit, which carries out operations to reduce memory resource cost for in-memory data storage systems in addition to carrying out normal memory control operations.

In a first aspect, the disclosure provides a storage aware memory controller for in-memory data processing, comprising: a system for mapping physical memory space into a memory region and a storage region; a system for applying different error protections schemes, in which a fine-grained memory fault tolerance scheme is applied to data in the memory region and a course-grained memory fault tolerance scheme is applied to data in the storage region; and a storage file system that includes a mapping table for mapping logical addresses to physical addresses for data stored in the storage region.

In a second aspect, the disclosure provides a memory system comprising: a physical memory; and a storage aware memory controller for in-memory data processing, wherein the storage aware memory controller includes: a system for mapping the physical memory into a memory region and a storage region; a system for applying different error protections schemes, in which a fine-grained memory fault tolerance scheme is applied to data in the memory region and a course-grained memory fault tolerance scheme is applied to data in the storage region; and a storage filesystem that includes a mapping table for mapping logical addresses to physical addresses for data stored in the storage region.

In a third aspect, the invention provides computer programming logic stored in a computer readable storage medium, which when executed by a processing core, provides storage aware memory control for in-memory data processing, and comprises: program logic for mapping physical memory space into a memory region and a storage region; program logic for applying different error protections schemes, in which a fine-grained memory fault tolerance scheme is applied to data in the memory region and a course-grained memory fault tolerance scheme is applied to data in the storage region; and program logic that implements a mapping table for mapping logical addresses to physical addresses for data stored in the storage region.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
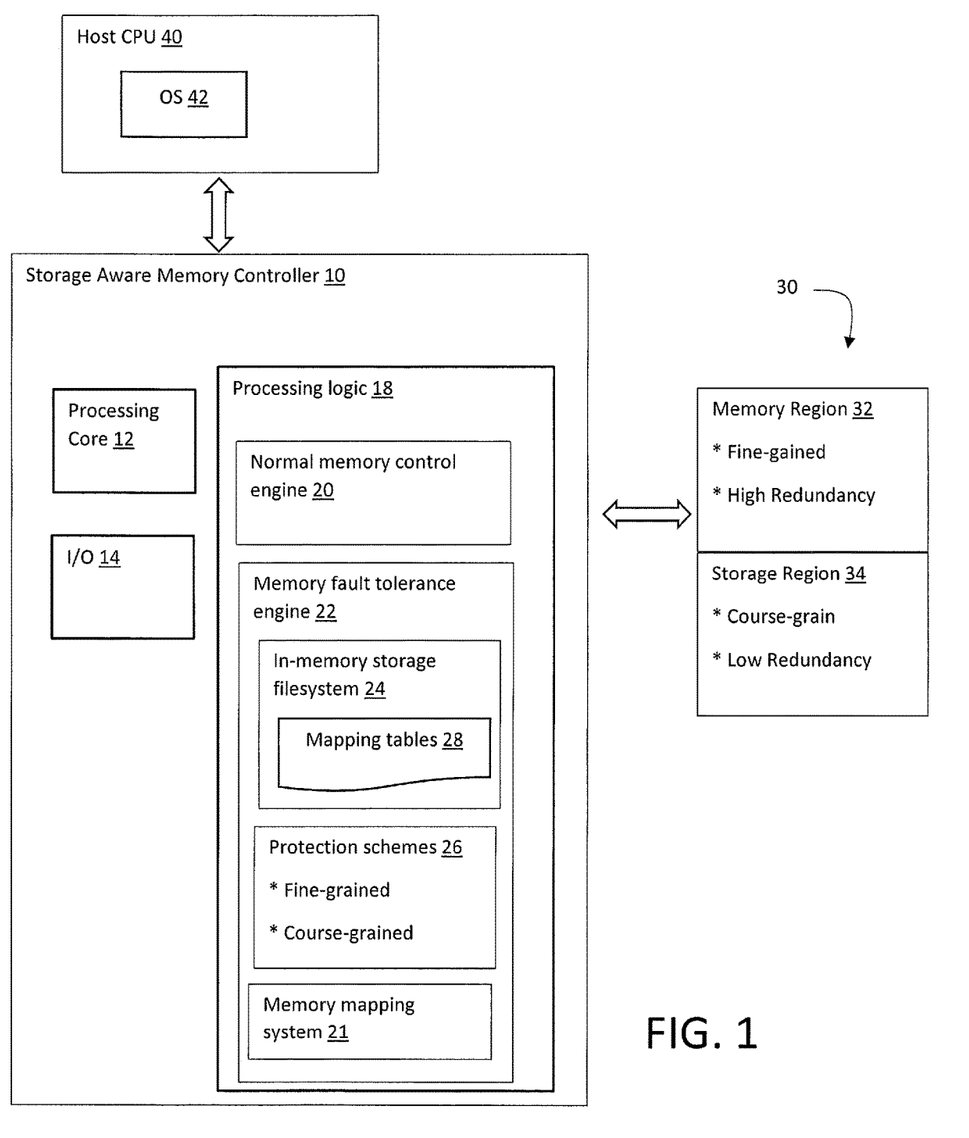
FIG. 1 illustrates the overall structure of the device according to embodiments.

FIG. 1 depicts a memory control system that generally includes a host CPU 40, physical memory space 30 (e.g., chips, such as DRAM, NVRAM, etc.), and an in-memory storage aware memory controller 10. In addition to carrying out typical memory control operations by the normal memory control engine 20, the present storage aware memory controller 10 further includes a versatile memory fault tolerance engine (MFTE) 22. MFTE 22 includes processing logic for protecting different memory regions of the physical memory space 30 with different memory fault tolerance granularities. The in-memory storage filesystem 24 allocates a portion of physical memory 30 and uses it to implement in-memory data storage. As a result, the entire memory space 30 contains two regions: (1) memory region 32 that behaves as normal memory and has a relatively fine-grained access pattern (e.g., 8 bytes or 16 bytes), and (2) storage region 34 that is managed by the in-memory storage filesystem 24 and has a relatively coarse-grained access pattern (e.g., 512 bytes or 4096 bytes).

The storage aware memory controller 10 include multiple protection schemes 26 that protect the memory region 32 and storage region 34 using different memory fault tolerance granularity and hence different redundancy overhead. Fine-grained memory fault tolerance protects memory devices with relatively small granularity (e.g., 8 bytes or 16 bytes), which typically comes with relatively high redundancy overhead. Coarse-grained memory fault tolerance protects memory devices with relatively large granularity (e.g., 128 bytes or 256 bytes), which typically comes with relatively low redundancy overhead. In particular, if the memory fault tolerance is realized by ECC, the storage aware memory controller 10 protects the memory region 32 using ECCs with relatively short codeword length and hence relatively high coding redundancy, and protects the storage region 34 using ECCs with relatively long codeword length and hence relatively low coding redundancy.

Figure 2:
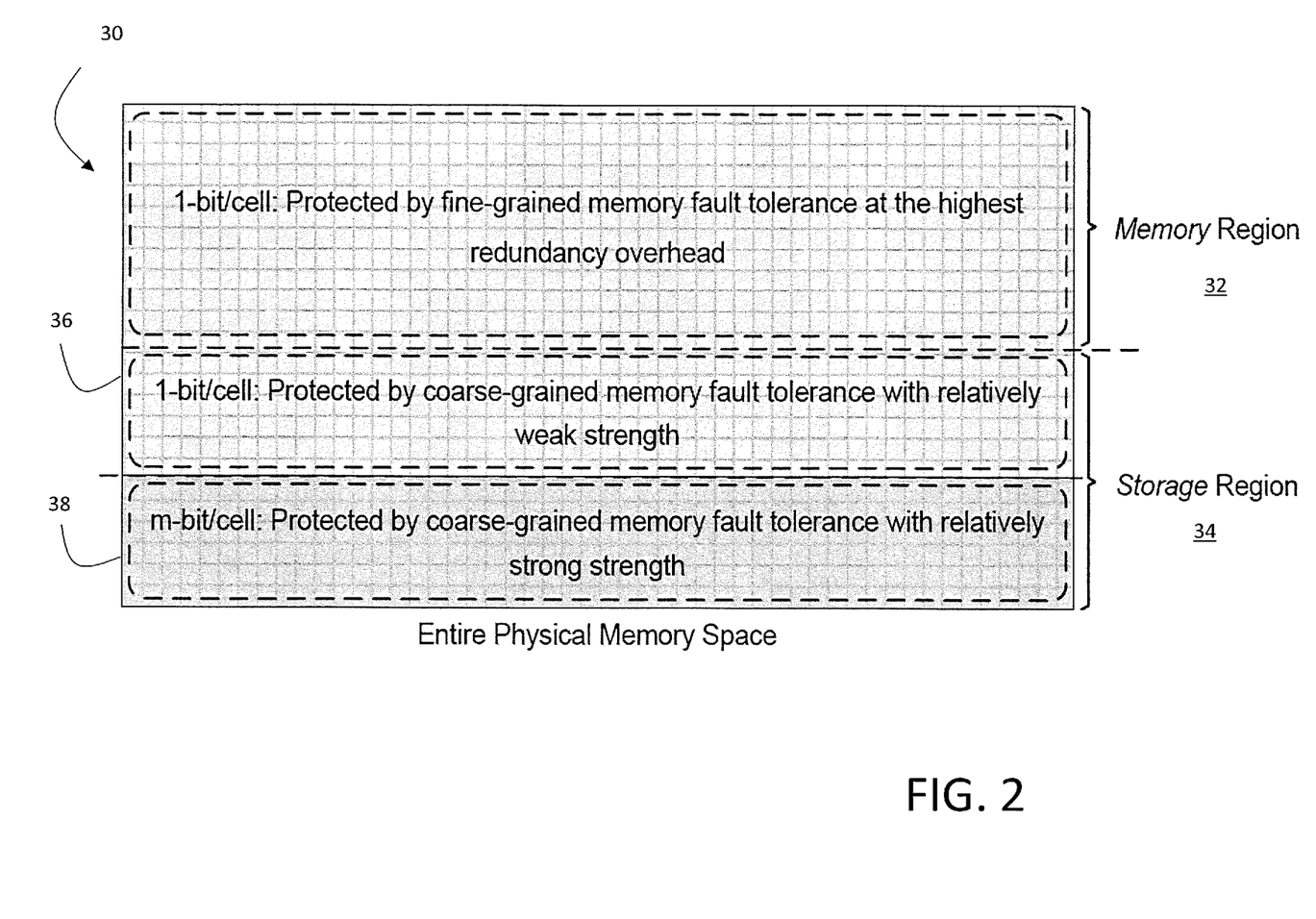
FIG. 2 illustrates the use of different memory fault tolerance to different regions according to embodiments.

As shown in FIG. 2, the entire memory space 30 is logically partitioned into a memory region 32 and a storage region 34. The mapping between the memory/storage region and physical memory devices can be dynamically changed by a memory mapping system 21 in memory fault tolerance engine 22 (FIG. 1). The memory region 32 is protected by a fine-grained memory fault tolerance scheme at high redundancy overhead, and storage region 34 is protected by coarse-grained memory fault tolerance scheme at low redundancy overhead. Since most emerging new memory technologies (such as 3D XPoint, phase-change memory, and ReRAM) can support multi-bit per cell (e.g., 2 bits/cell) operations at the cost of slower memory write/read speed, the storage region 34 can be further divided into a normal 1-bit/cell partition and an m-bit/cell (where m>1) partition. Multi-bit per cell results in worse raw memory reliability, hence it demands the use of even stronger memory fault tolerance. Therefore, as shown in FIG. 2, the 1-bit/cell partition and m-bit/cell partition in the storage region are protected by two different coarse-grained memory fault tolerance schemes.

In most computing systems, the operating system (OS) manages memory space in the unit of pages, where the page size is typically 4 kB and could be as high as a few MB. Let $s_p$ denote the memory page size, and let $r_p$ denote the fine-grained memory fault tolerance redundancy ratio. Hence, the total memory capacity of each memory page is $s_p(1+r_p)$. Meanwhile, in-memory data storage handles data write/read in the unit of blocks, where the block size is typically a few kBs (e.g., 4 kB). Let $s_b$ denote the in-memory storage block size. Since the memory page size (i.e., $s_p$) is typically divisible by the block size (i.e., $s_b$), hence denote $s_p = t \cdot s_b$. The in-memory storage filesystem 24 treats 1-bit/cell portions and m-bit/cell portions as different partitions, which are managed in different manners. For example:

1-Bit/Cell Partition:

Let $r_{b-1}$ denote the redundancy ratio of the coarse-grained memory fault tolerance being used for the 1-bit/cell partition. Hence, the total memory capacity of each in-memory storage block is $s_b(1+r_{b-1})$ in the 1-bit/cell partition. To allocate physical memory space for the 1-bit/cell storage partition, the in-memory storage filesystem 24 requests $n_{p-1}$ physical memory pages from the OS each time, so that these $n_{p-1}$ memory pages could store $n_{b-1}$ blocks in the 1-bit/cell storage partition, i.e., $n_{p-1}(1+r_p) \geq t \cdot n_{b-1}(1+r_{b-1})$. It is always desirable to keep $n_{p-1}$ and $n_{b-1}$ as small integers and meanwhile have a relatively small value of $[n_{p-1}(1+r_p) - t \cdot n_{b-1}(1+r_{b-1})]$. Each group of $n_{b-1}$ blocks forms a virtual block.

Figure 3:
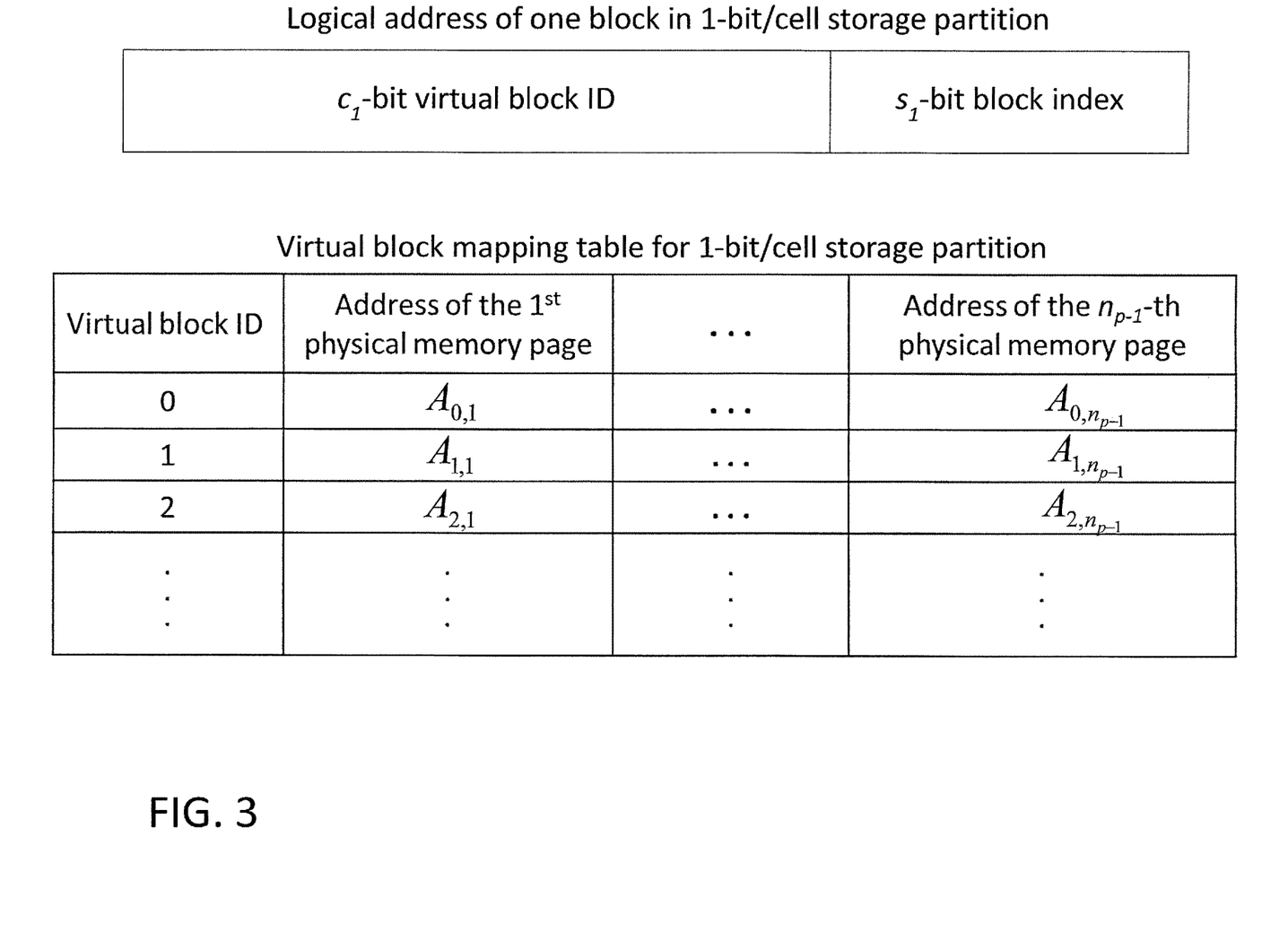
FIG. 3 illustrates the block logical address format and virtual block mapping table for 1-bit/cell storage partition according to embodiments.

Suppose the 1-bit/cell storage partition could store up to $2^{c_1}$ blocks, and define $s_1 = \lceil \log_2 n_{b-1} \rceil$. The in-memory data storage filesystem 24 registers each block in the 1-bit/cell partition using a logical address consisting of two parts, as shown in FIG. 3: (1) $c_1$-bit virtual block ID, which represents the unique logical ID of the virtual block that contains this block, and (2) $s_1$-bit block index $h_1$, i.e., this block is the $h_1$-th block being stored in the virtual block. In addition, as shown in FIG. 3, the filesystem 24 keeps a mapping table to record the addresses of the $n_{p-1}$ physical memory pages that are used to form one virtual block in the 1-bit/cell partition, where the storage blocks are written into the $n_{p-1}$ physical memory pages consecutively from the $1^{st}$ page the $n_{p-1}$-th page. The filesystem 24 can directly use the logical address and the mapping table to determine the physical location of each block in the memory.

m-Bit/Cell Partition:

Let $r_{b-m}$ denote the redundancy ratio of the coarse-grained memory fault tolerance being used for the m-bit/cell partition. Hence, the total memory capacity of each in-memory storage block is $s_b(1+r_{b-m})$ in the m-bit/cell partition. To allocate physical memory space for the m-bit/cell storage partition, the in-memory storage filesystem 24 requests $n_{p-m}$ physical memory pages from the OS each time, so that these $n_{p-m}$ memory pages could store $n_{b-m}$ blocks in the m-bit/cell storage partition, i.e., $n_{p-m}(1+r_p) \geq m \cdot t \cdot n_{b-m}(1+r_{b-m})$. It is always desirable to keep $n_{p-m}$ and $n_{b-m}$ as small integers, and the value of $[n_{p-1}(1+r_p) - t \cdot n_{b-1}(1+r_{b-1})]$ is relatively small. Each group of $n_{b-m}$ blocks forms a virtual block.

Figure 4:
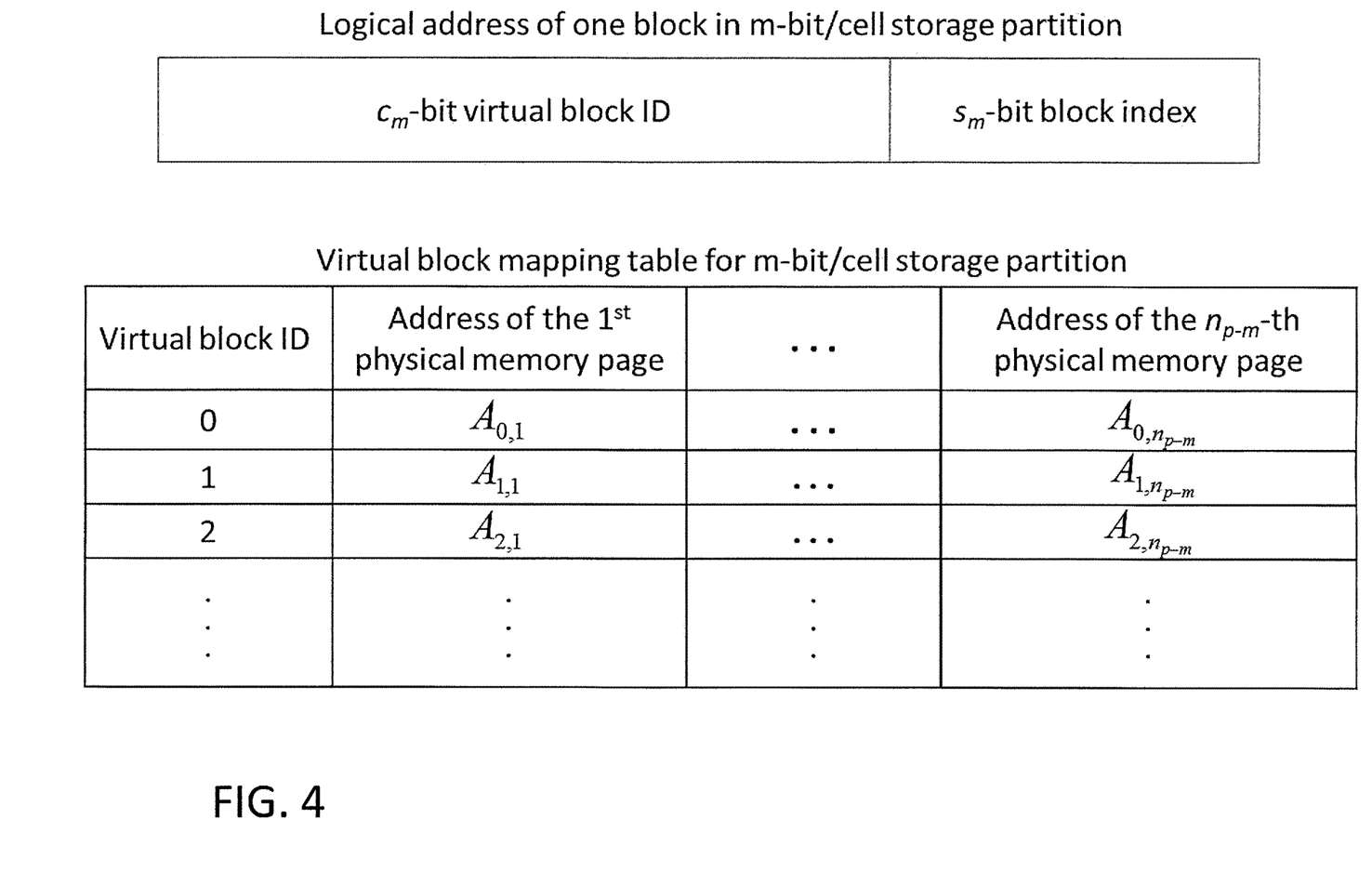
FIG. 4 illustrates the block logical address format and virtual block mapping table for m-bit/cell storage partition according to embodiments.

Suppose the m-bit/cell storage partition could store up to $2^{c_m}$ blocks, and define $s_m = \lceil \log_2 n_{b-m} \rceil$. The in-memory data storage filesystem 24 registers each block in the m-bit/cell partition using a logical address consisting of two parts, as shown in FIG. 4: (1) $c_m$-bit virtual block ID $V_m$, which represents the unique logical ID of the virtual block that contains this block, and (2) $s_m$-bit block index $h_m$, i.e., this block is the $h_m$-th block being stored in the virtual block. In addition, as shown in FIG. 4, the filesystem 24 keeps a mapping table to record the addresses of the $n_{p-m}$ physical memory pages that are used to form one virtual block in the m-bit/cell partition, where the storage blocks are written into the $n_{p-1}$ physical memory pages consecutively from the $1^{st}$ page the $n_{p-m}$-th page. The filesystem 24 can directly use the logical address and the mapping table to determine the physical location of each block in the memory.

When using in-memory data storage, data are frequently moved/copied between the memory region 32 and storage region 34 (either 1-bit/cell or m-bit/cell partition in the storage region). In addition, as data access characteristics change over the time, the computing systems may need to move data between the 1-bit/cell partition 36 and m-bit/cell partition 38 (FIG. 2). The storage aware memory controller 10 directly supports all these across region/partition data movement. Since different region/partition are protected with different fault tolerance schemes (e.g., different error correction codes), data must be processed by the corresponding memory fault tolerance engine scheme 26 when being moved across different regions/partitions. For example, if the memory fault tolerance is realized by error correction code (ECC), and let $E_e$, $E_{s-1}$, and $E_{s-m}$ denote the three ECCs that protect the memory region, 1-bit/cell storage partition, and m-bit/cell storage partition, respectively.

Figure 5:
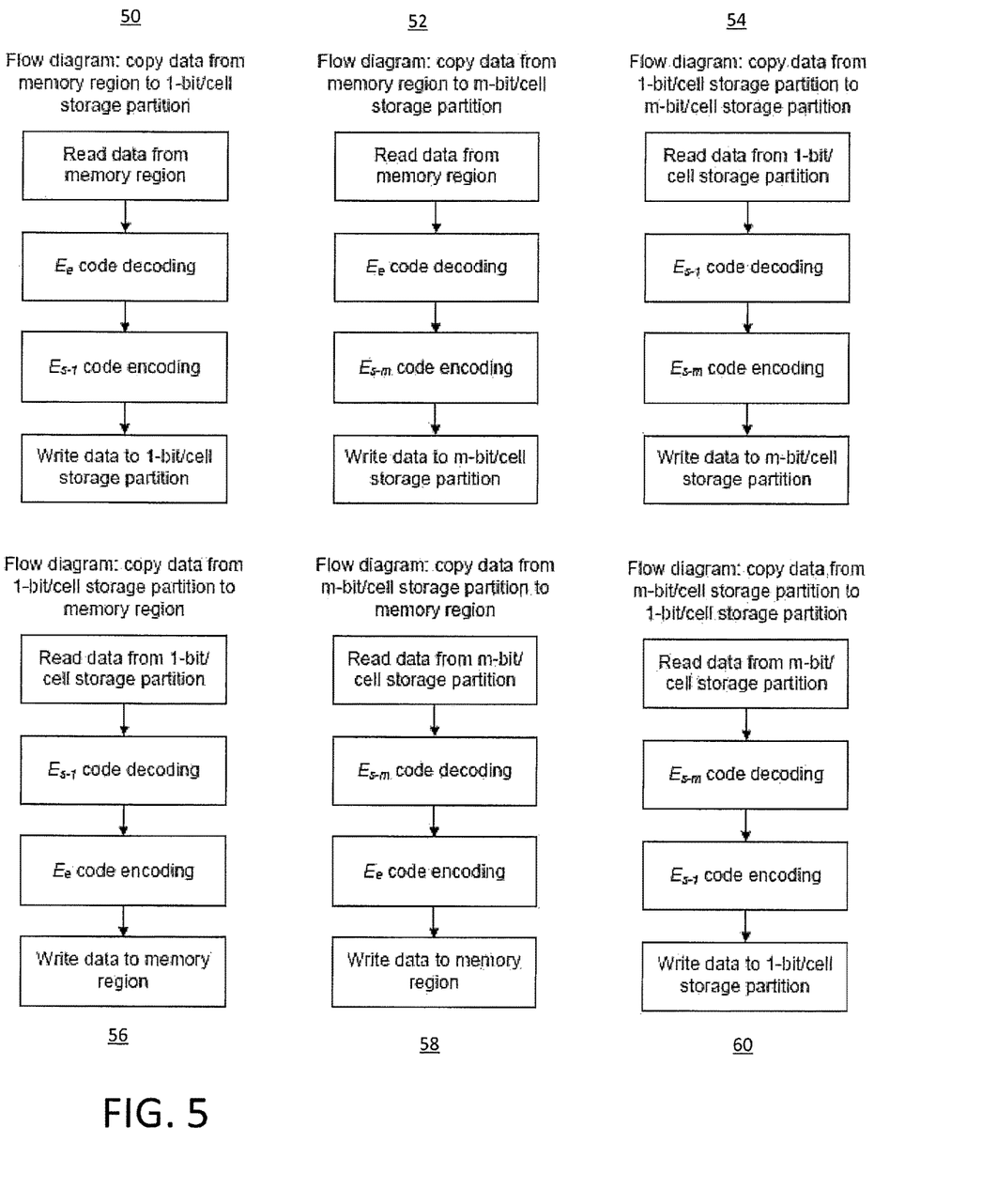
FIG. 5 illustrates the flow diagrams when copying data across different regions according to embodiments.

FIG. 5 shows the operational flow diagram of the storage aware memory controller 10 that supports across-region/partition data movement. Each of the following flows may for example be implemented by processing logic 18. Flow 50 shows the process for copying data from memory region 32 to a 1-bit/cell storage region 36. In this case $E_e$ code decoding and $E_{s-1}$ code decoding are used. Flow 52 shows the process for copying data from memory region 32 to a m-bit/cell storage region 38. In this case $E_e$ code decoding and $E_{s-m}$ code decoding are used. Flow 54 shows the process for copying data from a 1-bit/cell storage region 36 to an m-bit/cell storage region 38. In this case $E_{s-1}$ code decoding and $E_{s-m}$ code decoding are used. Flow 56 shows the process for copying data from a 1-bit/cell storage region 36 to memory region 32. In this case $E_{s-1}$ code decoding and $E_e$ code decoding are used. Flow 58 shows the process for copying data from a m-bit/cell storage region 38 to memory region 32. In this case $E_{s-m}$ code decoding and $E_e$ code decoding are used. Finally, flow 60 shows the process for copying data from a m-bit/cell storage region 38 to 1-bit/cell storage region 36. In this case $E_{s-m}$ code decoding and $E_{s-1}$ code decoding are used.

It is understood that the storage aware memory controller 10 may be implemented in any manner, e.g., as an integrated circuit board that includes a processing core 12, I/O 14 and processing logic 18. Processing logic may be implemented in hardware/software, or a combination thereof. For example, some of the aspects of the processing logic may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, it is understood that the processing logic 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed:

1. A storage aware memory controller for in-memory data processing, comprising:
    a system for mapping physical memory space into a memory region and a storage region;
    a system for applying different error protections schemes, in which a fine-grained memory fault tolerance scheme is applied to data in the memory region and a course-grained memory fault tolerance scheme is applied to data in the storage region; and
    a storage file system that includes a mapping table for mapping logical addresses to physical addresses for data stored in the storage region;
    wherein the storage region includes a first partition for 1-bit/cell data storage and a second partition for m-bit/cell data storage, wherein m is greater than 1.

2. The storage aware memory controller of claim 1, wherein the m-bit/cell data storage partition utilizes a course grained memory fault tolerance scheme that is relatively stronger than that used for 1-bit/cell data storage.

3. The storage aware memory controller of claim 2, wherein the storage file system includes a first mapping table for mapping data in the 1-bit/cell data storage partition to a physical address and a second mapping table for mapping data in the m-bit/cell data storage partition to a physical address.

4. The storage aware memory controller of claim 1, wherein the mapping table utilizes a logical address that includes a virtual block ID and block index.

5. The storage aware memory controller of claim 1, further comprising logic for moving data between and among the memory region, 1-bit/cell data storage partition, and m-bit/cell data storage partition.

6. The storage aware memory controller of claim 1, wherein the fine-grained memory fault tolerance scheme provides access patterns of 8-16 bytes, and the course-grained memory fault tolerance scheme provides access patterns of 512-4096 bytes.

7. A memory system comprising:
    a set of memory chips that form a physical memory; and
    a storage aware memory controller for in-memory data processing, wherein the storage aware memory controller includes:
        a system for mapping the physical memory into a memory region and a storage region;
        a system for applying different error protections schemes, in which a fine-grained memory fault tolerance scheme is applied to data in the memory region and a course-grained memory fault tolerance scheme is applied to data in the storage region; and
        a storage filesystem that includes a mapping table for mapping logical addresses to physical addresses for data stored in the storage region;
        wherein the storage region includes a first partition for 1-bit/cell data storage and a second partition for m-bit/cell data storage, wherein m is greater than 1.

8. The memory system of claim 7, wherein the m-bit/cell data storage partition utilizes a course grained memory fault tolerance scheme that is relatively stronger than that used for 1-bit/cell data storage.

9. The memory system of claim 8, wherein the storage filesystem includes a first mapping table for mapping data in the 1-bit/cell data storage partition to a physical address and a second mapping table for mapping data in the m-bit/cell data storage partition to a physical address.

10. The memory system of claim 7, wherein the mapping table utilizes a logical address that includes a virtual block ID and block index.

11. The memory system of claim 7, further comprising logic for moving data between and among the memory region, 1-bit/cell data storage partition, and m-bit/cell data storage partition.

12. The memory system of claim 7, wherein the fine-grained memory fault tolerance scheme provides access patterns of 8-16 bytes, and the course-grained memory fault tolerance scheme provides access patterns of 512-4096 bytes.

13. Computer programming logic stored in a computer readable storage medium, which when executed by a processing core, provides storage aware memory control for in-memory data processing, and comprises:

program logic for mapping physical memory space into a memory region and a storage region;
  program logic for applying different error protections schemes, in which a fine-grained memory fault tolerance scheme is applied to data in the memory region and a course-grained memory fault tolerance scheme is applied to data in the storage region; and
  program logic that implements a mapping table for mapping logical addresses to physical addresses for data stored in the storage region;
  wherein the storage region includes a first partition for 1-bit/cell data storage and a second partition for m-bit/cell data storage, wherein m is greater than 1.

14. The computer programming logic of claim 13, wherein the m-bit/cell data storage partition utilizes a course grained memory fault tolerance scheme that is relatively stronger than that used for 1-bit/cell data storage.

15. The computer programming logic of claim 13, wherein the mapping table includes a first mapping table for mapping data in the 1-bit/cell data storage partition to a physical address and a second mapping table for mapping data in the m-bit/cell data storage partition to a physical address.

16. The computer programming logic of claim 13, wherein the mapping table utilizes a logical address that includes a virtual block ID and block index.

17. The computer programming logic of claim 13, further comprising program logic for moving data between and among the memory region, 1-bit/cell data storage partition, and m-bit/cell data storage partition.

* * * * *